(No Model.)

G. W. TOWAR, Jr.
EMULSIFIER.

No. 378,381. Patented Feb. 21, 1888.

Witnesses
Thos. E. Robertson.
C. H. Raeder.

Inventor
Geo. W. Towar, Jr.
By his Attorney
T. W. Robertson.

United States Patent Office.

GEORGE W. TOWAR, JR., OF DETROIT, MICHIGAN.

EMULSIFIER.

SPECIFICATION forming part of Letters Patent No. 378,381, dated February 21, 1888.

Application filed May 13, 1887. Serial No. 238,124. (No model.)

*To all whom it may concern:*

Be it known that I, GEORGE W. TOWAR, Jr., a resident of Detroit, in the county of Wayne and State of Michigan, have invented new and useful Improvements in Emulsifiers; and I hereby declare that the following is a full, clear, and exact description thereof, reference being had to the accompanying drawings, which form a part of this specification.

This invention relates to new and useful improvements in emulsifiers designed for making an artificial cream with a mixture of butter, oil, and cows' milk.

The invention consists in the novel construction and arrangement of parts, all as hereinafter described, and shown in the accompanying drawings, in which—

Figure 1:
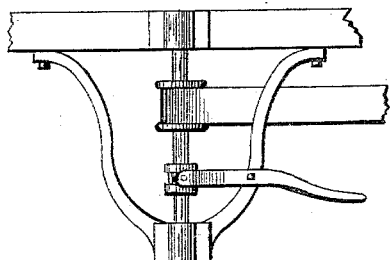
Figure 2:
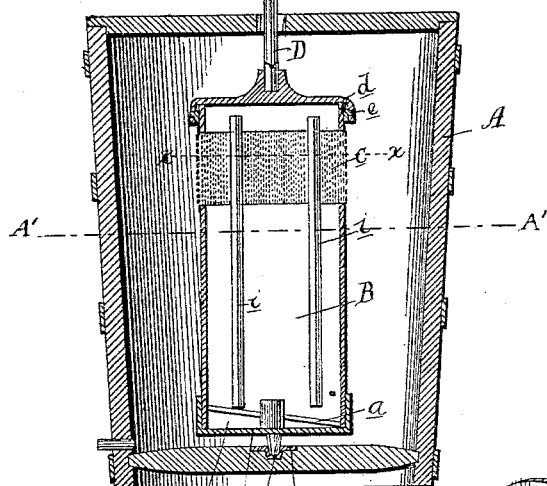
Figure 2:
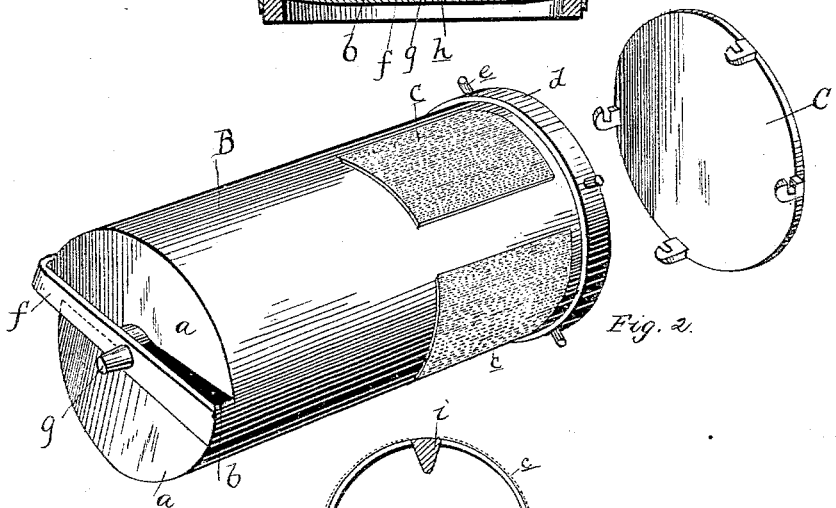
Figure 3:
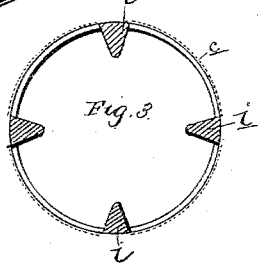

Figure 1 is a vertical central section showing my apparatus as arranged for use. Fig. 2 is a detached perspective of the revolving cylinder and the cover. Fig. 3 is a cross section of the cylinder on line $x\ x$.

The emulsifier consists of a suitable wooden tub, A, to contain the milk and oil, and a metal cylinder, B, which revolves in the tub on its vertical axis. This cylinder is made of suitable metal—such as tin or copper—its preferable size being about a foot in diameter and thirty inches in length, and its bottom is formed of two spiral blades, $a\ a$, of about half a turn each, and arranged, as shown, so as to leave vertical openings $b$ in the bottom between the blades, as shown, the purpose of which is to raise the fluid to be emulsified to or near to the top of said cylinder when the latter is rapidly revolving.

The upper portion of the cylinder is perforated, there being, preferably, three or four large openings provided near the top of the cylinder and covered with a very-finely perforated copper plate, $c$, occupying about nine-tenths of the circumference and about six inches in height.

To the upper end of the cylinder is affixed a strong steel band, $d$, which carries small projections or lugs $e$, to detachably receive and fasten a cover or cap, C, to which suitable mechanism for revolving the cylinder is applied, there being, preferably, a step formed in the center of the cap, into which the lower end of the vertical shaft D may be detachably engaged to revolve said cylinder. The lower end of the cylinder is preferably provided with a cross-piece, $f$, of steel, which carries in its center the pintle $g$, which fits into a convenient step or journal, $h$, in the bottom of the wooden tub. The cylinder is fitted on the inside with vertical projecting ribs $i$, to give it rigidity and to prevent the fluid from following the revolutions of the machine.

The operation of making the artificial cream by means of this machine is as follows: The milk and oil being placed in the tub at a temperature of 105° to 110° Fahrenheit, in the proportion of three volumes of milk to one of oil, the shaft is attached and a motion of five to six hundred revolutions per minute given to the cylinder. The effect of this rapid rotation of cylinder is to carry the mixed fluids, by means of the spiral blades, up near its top, where the finely-perforated plates are situated. The centrifugal force developed by this rapid rotation is sufficient to force the fluid through these openings with considerable speed, and it flies out against the tub and sinks again into the fluid below, to be again carried up and through the openings as before, and so on until the emulsion is perfected. The line A A in Fig. 1 indicates the height to which the fluid is introduced in the tub A.

I do not claim the process of making artificial cream herein described, as this process forms the subject-matter of a concurrent application filed April 29, 1885, Serial No. 163,906.

What I claim as my invention is—

1. In an emulsifier, a cylindrical vessel provided with a closed top, a spirally-formed bottom, and perforated plates near its top, substantially as described.

2. In an emulsifier, a cylindrical vessel provided with a spirally-formed bottom, a series of perforations near its top, a detachable cover, and one or more interior ribs, the whole arranged for operation in connection with a stationary tub, substantially as described.

3. In an emulsifier, the combination, with the tub A, of the cylinder B, provided with the spiral blades $a$, detachable cap C, having a step formed in its center, ribs $i$, perforations $c$, and the detachable vertical shaft D, all arranged to operate substantially as described.

GEO. W. TOWAR, JR.

Witnesses:
A. BARTHEL,
J. PAUL MAYER.